United States Patent

[11] 3,627,910

[72] Inventors Peter Johannes Hubertus Janssen; Wouter Smeulers, both of Emmasingel, Eindhoven, Netherlands

[21] Appl. No. 863,803
[22] Filed Oct. 6, 1969
[45] Patented Dec. 14, 1971
[73] Assignee U.S. Philips Corporation New York, N.Y.
[32] Priority Oct. 5, 1968
[33] Netherlands
[31] 6814299

[54] IDENTIFICATION CIRCUIT FOR PAL COLOR TELEVISION RECEIVER
10 Claims, 6 Drawing Figs.

Figure 1:
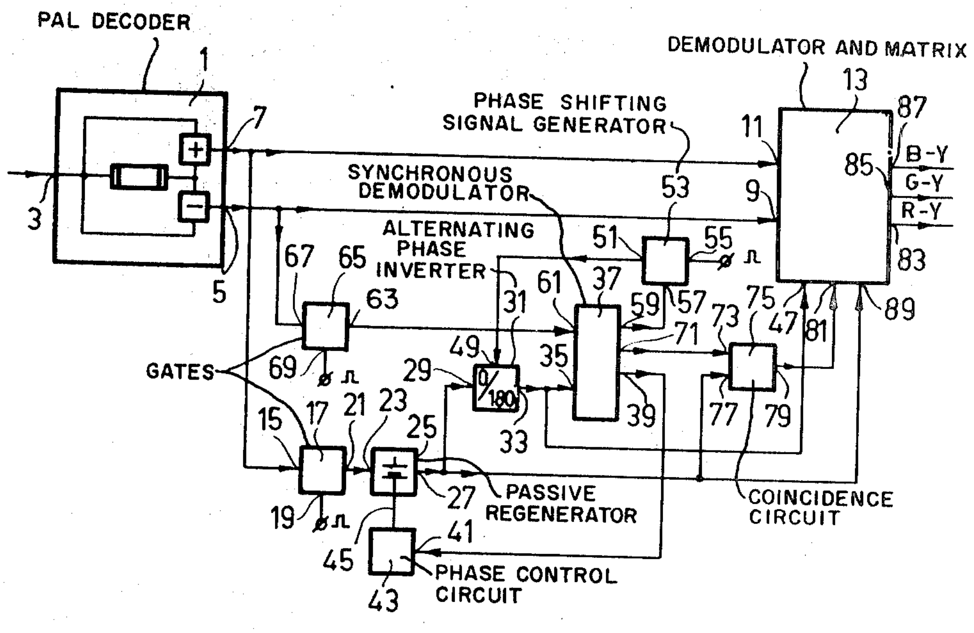

[52] U.S. Cl. .......... 178/5.4 P, 178/5.4 SY
[51] Int. Cl. .......... H04n 9/46
[50] Field of Search .......... 178/5.4, 5.4 P, 5.4 SY

[56] References Cited
UNITED STATES PATENTS

| | | | |
|---|---|---|---|
| 3,492,417 | 1/1970 | Scholz | 178/5.4 P |
| 3,534,156 | 10/1970 | Henze | 178/5.4 P |

*Primary Examiner*—Robert L. Griffin
*Assistant Examiner*—John C. Martin
*Attorney*—Frank R. Trifari ABSTRACT: An identification circuit for a PAL television signal has a PAL decoder having an alternating phase output. A synchronous demodulator is coupled to the decoder output and to a passive regenerator. A phase control circuit is coupled to the demodulator and to the regenerator. An alternating phase inverter is coupled to a demodulator input and is controlled by a phase shift generator coupled to the demodulator.

INVENTORS
PETER J. H. JANSSEN
WOUTER SMEULERS
BY
AGENT

INVENTORS
PETER J. H. JANSSEN
WOUTER SMEULERS
BY

AGENT

INVENTORS
PETER J. H. JANSSEN
WOUTER SMEULERS
BY

AGENT

IDENTIFICATION CIRCUIT FOR PAL COLOR TELEVISION RECEIVER

The invention relates to an identification circuit for a PAL color television receiver comprising a PAL decoder having an input for a quadrature modulated chrominance subcarrier signal to be decoded, which signal comprises at least a color burst signal having a component of substantially constant phase and component differing in phase therefrom by 90° or 270° alternately from line to line, and a first output from which the component of the alternating phase of at least the color burst signal can be derived, a synchronous demodulator a signal input of which is coupled with the said first output and a subcarrier input is coupled with an output of a chrominance subcarrier regeneration circuit, an output of the synchronous demodulator being coupled with an input of a PAL phase switches signal generator, the chrominance subcarrier regeneration circuit including a phase control circuit.

An identification circuit of the kind described above is known from Radio Mentor 7, (1966) page 595, in which a second synchronous demodulator is required for the automatic phase compensation of the chrominance subcarrier regeneration circuit. An object of the invention is to omit this second synchronous demodulator and to provide a novel type of identification circuit.

To this end, an identification circuit of the kind described in the preamble according to the invention is characterized in that the chrominance subcarrier regeneration circuit includes a regenerator of the passive integrator type, a control signal output of the said synchronous demodulator being coupled with a control signal input of the phase control circuit, and a phase inverter which can be switched by means of an operation signal being incorporated in at least one of the couplings between the chrominance subcarrier regeneration circuit or the first output of the PAL decoder and the inputs of the synchronous demodulator, at least an operation signal input of said phase inverter being coupled with an output of the PAL phase switching signal generator.

Due to these steps it is achieved that the phase deviation of the chrominance subcarrier regeneration circuit including the passive integrator is adjusted at substantially 90° relative to the desired phase in case of a possibly occurring erroneous switching state of the PAL phase switching signal generator. A maximum voltage is then produced by the said synchronous demodulator. This voltage serves as an This signal for restoring the correct switching state of the PAL phase switching signal generator. In the correct switching state, the voltage produced by the synchronous demodulator attempts to adjust to substantially zero as a result of the presence of this synchronous demodulator in the phase control loop of the subcarrier frequency circuit. An optimum accurate conformity of the phase of the subcarrier signal with the desired phase, which is represented by the component of constant phase of the color burst signal, is then obtained.

In order that the invention may be readily carried into effect, a few embodiments thereof will now be described in detail, by way of example, with reference to the accompanying diagrammatic drawings in which the details which are not important for the understanding of the invention have been omitted.

Figure 2:
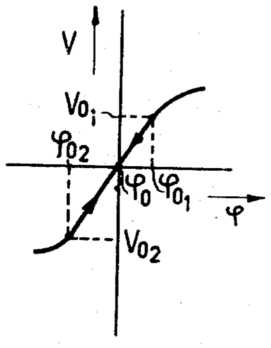
Figure 3:
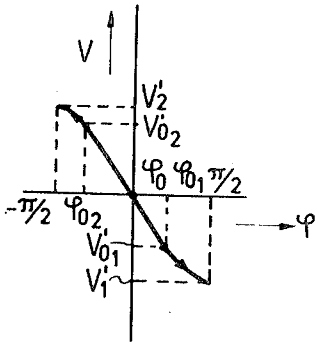
Figure 4:
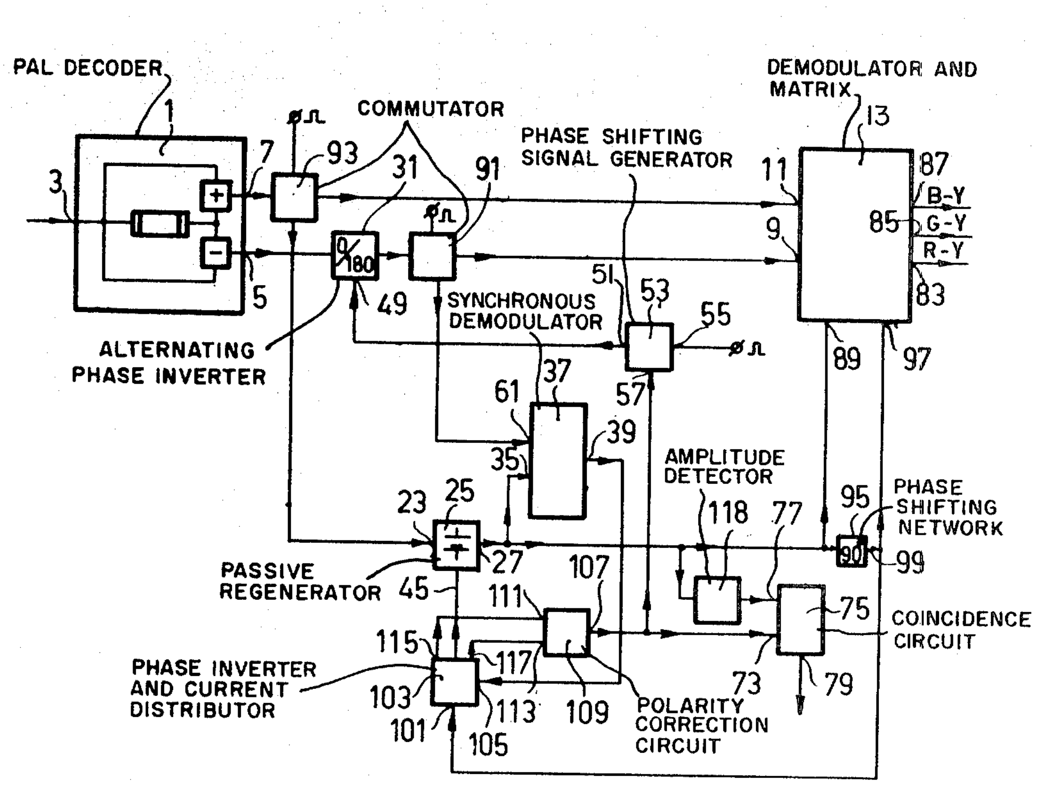
Figure 6:
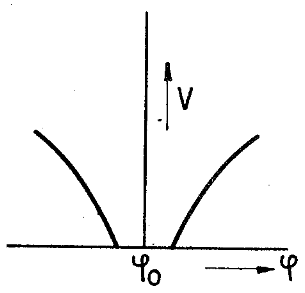
Figure 5:
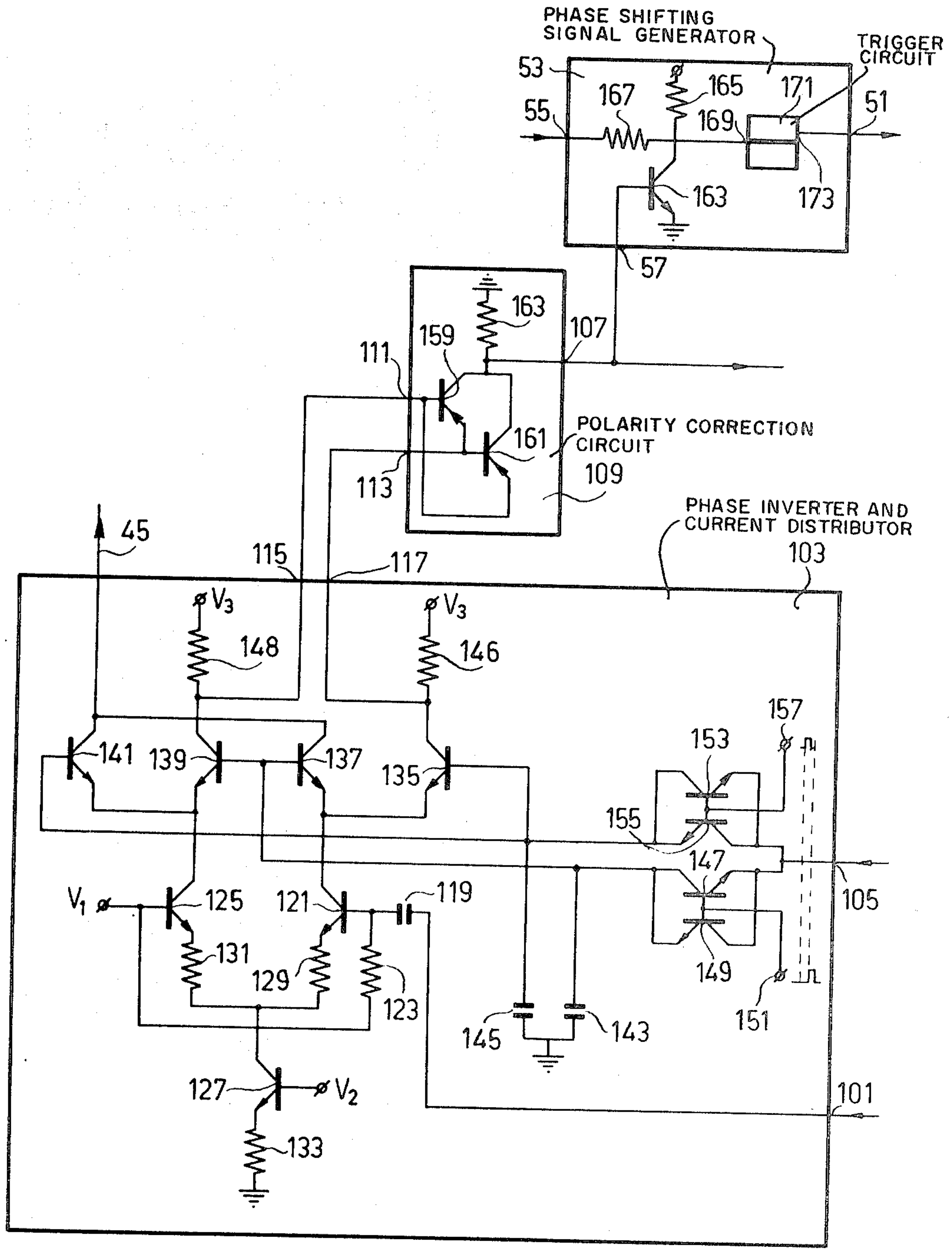

FIG. 1 shows by way of a nondetailed block diagram an identification circuit according to the invention, FIG. 2 shows by way of an error voltage as function of phase deviation diagram the behavior of the circuit of FIG. 1 in case of a correct switching state of the PAL phase switching signal generator, FIG. 3 shows by way of an error voltage as function of phase deviation diagram the behavior of the circuit of FIG. 1 in case of an incorrect switching state of the PAL phase switching signal generator, FIG. 4 shows by way of nondetailed block diagram an identification circuit according to the invention in which the 90° phase shifting network, which is required to obtain the correct mutual positions of the color difference signal demodulation axes, is incorporated in a reactance circuit of the automatic phase control, FIG. 5 shows by way of a nondetailed principle circuit diagram part of the circuit of FIG. 4 suitable for construction in an integrated circuit, FIG. 6 shows by way of an error voltage as function of phase deviation diagram the behavior of the circuit of FIG. 5.

In FIG. 1 a PAL decoder 1 has an input 3, a first output 5 and a second output 7. When a modulated PAL chrominance subcarrier signal is received at the input 3, the component of the alternating phase appears at the first output 5 and the component of the constant phase of this chrominance subcarrier signal appears at the second output 7. The outputs 5 and 7 are connected to inputs 9 and 11 of a demodulator and matrix circuit 13.

The second output 7 of the decoder 1 is furthermore connected to an input 15 of a gating circuit 17. The gating circuit 17 furthermore has an input 19 to which keying pulses are applied and an output 21 at which a color burst signal component of a constant phase appears. The output 21 is connected to an input 23 of a chrominance subcarrier regenerator 25 which according to the invention must be of the passive type and will hereinafter be referred to as passive integrator.

According to the invention an output 27 of the passive integrator 25 is connected to an input 29 of a phase inverter 31. According to the invention an output 33 of the phase inverter 31 is furthermore connected to a subcarrier input 35 of a synchronous demodulator 37, and a control signal output 39 of the demodulator 37 is connected to a control signal input 41 of phase control circuit 43. The phase control circuit 43 is connected through a line 45 to the passive integrator 25. The phase inverter 31 produces a subcarrier signal at the output 33 which alternates 180° in phase from line to line.

The output 33 of the phase inverter 31 is also connected to an input 47 of the demodulator 13. A reference signal for synchronous detection of the chrominance signal component of the alternating phase applied to the input 9 can be derived, with the aid of a phase shifting network, from the subcarrier signal produced at the output 33 of the phase inverter 31.

The phase inverter 31 has an input 49 which is connected to an output 51 of a PAL phase switching signal generator 53. An operation signal of the phase inverter 31 is obtained from this output 51. The phase switching signal generator 53 comprises a 2 to 1 divider circuit which is operated by a pulse signal of line frequency for example, a line flyback voltage applied to an input 55 thereof. The switching state of the phase inverter 53 can be corrected with the aid of an identification signal which is applied to an input 57 thereof. To this end the input 57 is connected to an output 59 of the synchronous demodulator 37.

The synchronous demodulator 37 has a signal input 61 which is connected to an output 63 of a gating circuit 65. An input 67 of the gating circuit 65 is connected to the first output 5 of the PAL decoder 1. The gating circuit 65 furthermore has an input 69 to which a keying signal is applied. As a result the component of the alternating phase of the color burst signal is obtained at the signal input 61 of the synchronous demodulator 37. This color burst signal component which alternates in phase by 180° from line to line is demodulated in the synchronous demodulator 37 with the aid of the reference signal likewise alternating in phase by 180° from line to line and applied to the subcarrier input 35. Under the influence of the phase control circuit 43 in the correct switching state of the phase switching signal generator, this reference signal has a phase which differs substantially 90° from that of the color burst signal component which is applied to the signal input 61, and in the incorrect switching state it has a phase which is approximately equal thereto or differs approximately 180° therefrom.

The synchronous demodulator 37 furthermore has an output 71 which according to a further elaboration of the invention is connected to an input 73 of a coincidence circuit 75. A further input 77 of the coincidence circuit 75 is connected to the output 27 of the passive integrator 25. Only in the presence of a chrominance signal at the input 3 and in the correct switching state of the phase inverter 31 does the coincidence circuit 75 apply signal to a color killer signal output 79, which signal releases the demodulator and matrix circuit 13 through an input 81 of this circuit connected to the output 79, so that this circuit can apply demodulated color difference signals to three outputs 83, 85 and 87 thereof.

For supplying a reference signal having a nonalternating phase, the passive integrator output 27 is connected to an input 89 of the demodulator and matrix circuit 13.

The operation of the identification circuit in so far as this is important for the understanding of the invention will now be described with reference to FIGS. 2 and 3.

Firstly let it be assumed that the switching state of the phase switching signal generator 53 is correct. Furthermore, the initial phase of the subcarrier signal at the output 27 of the passive integrator in the uncontrolled condition is assumed to be $\Phi_0$ relative to the desired phase $\Phi_{01}$.The control voltage V at the output 39 of the synchronous demodulator 37 is then $V_{0_1}$ (see FIG. 2). This control voltage will attempt to readjust the phase of the output signal of the passive integrator to the value $\Phi_0$ through the phase control circuit 43. If the initial phase would be $\Phi_0$ relative to the desired phase $\Phi_0$ a control voltage $V_{0_2}$ would appear at the output 39, which would readjust the phase of the signal at the output 27 of the passive integrator 25 to $\Phi_0$ through the phase control circuit. If the output signal of the passive integrator has the desired phase $\Phi_0$, the phase difference between the voltages at the inputs 35 and 61 of the synchronous demodulator 37 is 90°. Therefore no signals appear at the outputs 71 and 59 of the synchronous demodulator 37, so that no color killing signal is produced at the coincidence circuit 77 and no identification signal is produced at the phase switching signal generator 53. The 2 to 1 divider of the latter thus retains its correct switching state.

Let it now be assumed that the 2 to 1 divider of the phase switching signal generator 53 is in its incorrect switching state. The reference signal at the input 35 of the synchronous demodulator 37 will then differ in phase by 180° from that of the case described above and the characteristic which represents the control voltage V at the output 39 as a function of the phase angle $\Phi$ of the reference signal at the input 35 will vary according to FIG. 3. A voltage $V_{0_1}'$ associated with an initial phase $\Phi_{0_1}$ now has the polarity opposite to that in the previous case, and the phase deviation $\Phi$ of the signal at the input 35 relative to the desired phase $\Phi_0$ through the phase control circuit 43 will now increase instead of decrease as was the case in the correct switching state of the phase inverter 53. Since the chrominance subcarrier regenerator 25 is a passive integrator, this phase shift will not be able to exceed 90° and the control voltage V will show its maximum value $V_1'$, which is represented in a negative form of this case. In an analogous manner, the phase control circuit will tend to a phase deviation of −90° in case of an initial phase $\Phi_{0_2}$ and a control voltage $V_{0_2}'$, with which is associated a control voltage $V_2'$ shown in this case in its maximum positive form. In these two cases the synchronous demodulator 37 also applies a signal of great value to its outputs 71 and 59. A color killing will then be effected by the signal at the output 71, and the switching state of the phase switching signal generator 53 will be brought from the incorrect to the correct state.

Part of the identification circuit of FIG. 4 has a structure analogous to that of FIG. 1. The same reference numerals as those in FIG. 1 have been used for this part and for the description thereof reference is made to the description of FIG. 1.

The major differences from the circuit of FIG. 1 are the following. The phase inverter 31 is incorporated in the chrominance signal path after the output 5. The phase of the modulated subcarrier signal is now shifter 180° from line to line in the phase inverter 31. Instead of the gating circuits 65 and 17, electronic commutator switches 91 and 93 are incorporated in this case. During the occurrence of the color burst signal, these commutator switches 91, 93, connect the outputs 5 and 7 of the decoder 1 to the inputs 61 and 23 of the synchronous demodulator 37 and the passive integrator 25, respectively. During the remainder of the period the commutator switches 91, 93 connect the outputs 5 and 7 of the decoder 1 to the inputs 9 and 11 of the demodulator and matrix circuit 13.

The output 27 of the passive integrator 25 is connected through a phase-shifting network 95 of 90° to a reference signal input 97 of the demodulator and matrix circuit 13. According to a further elaboration of the invention an output 99 of this phase-shifting network 95 is connected to an input 101 of a phase inverter and distributor circuit 103. A control signal input 105 of the phase inverter and distributor circuit 103 is connected to the control signal output 39 of the synchronous demodulator 37. As a result a subcarrier voltage is applied through the connection 45 to the passive integrator, which voltage dependent on the control signal, differs 90° or 270° in phase from the voltage at the output 27 of the passive integrator 25, and whose amplitude is also dependent on the control signal applied to the control signal input 105. As a result a phase correction of the output signal of the passive integrator 25 is obtained under the influence of the control signal at the input 105.

A further difference from the circuit arrangement of FIG. 1 is that the input 57 of the PAL phase inversion signal generator 53 and the input 73 of the coincidence circuit 75 for the color killing are connected to an output 107 of a polarity correction circuit 109. Two inputs 111 and 113 of the polarity correction circuit 109 are connected to outputs 115 and 117 of the phase inverter and distributor circuit 103. The input 77 of the coincidence circuit 75 is connected through an amplitude detector 118 to the output 27 of the passive integrator 25.

The principle circuit diagram of the phase inverter and distributor circuit 103, the polarity correction circuit 109 and the PAL phase switching signal generator 53 of the circuit arrangement of FIG. 4 is shown in FIG. 5. The operation of this combination will be described hereinafter with reference to FIG. 5.

In FIG. 5 the input 101 to which is applied the subcarrier signal which is 90° shifted in phase by the phase-shifting network 95 and which is obtained from the output 27 of the passive integrator 25, is connected through a capacitor 119 to the base of a transistor 121. The base of this transistor 121 is furthermore connected through a resistor 123 to a supply source $V_1$. To this supply source $V_1$ is also connected the base of a transistor 125 which forms a phase inverter circuit together with the transistor 121 and a transistor 127 which is incorporated in a common part of the emitter lines of the transistors 121 and 125. The emitters of the transistors 121 and 125 are connected through resistors 129 and 131 to the collector of the transistor 127. The emitter of the transistor 127 is connected to earth through a resistor 133. The base of the transistor 127 is connected to a supply source $V_2$ which supplies a voltage which is lower than that from the supply source $V_1$.

The collector currents of the transistors 121 and 125 are influenced in phase opposition by the subcarrier signal at the base of the transistor 121.

The collector of the transistor 121 is connected to the emitters of two transistors 135 and 137 which form part of a current distribution circuit. The collector of the transistor 125 is connected to the emitters of two transistors 139 and 141 which form part of a further current distribution circuit. The bases of these transistors 137 and 139 are connected together and to a capacitor 143. The bases of the transistors 135 and 141 are connected together and to a capacitor 145. The other end of the capacitors 143 and 145 are connected to earth. The collectors of the transistors 137 and 141 are connected to the output line 45. The collector of the transistor 135 is connected to the output 117 through a resistor 146 to a supply source $V_3$ which supplies a voltage which is higher than that from the voltage source $V_1$. The collector of the transistor 139 is connected to the output 115 and through a resistor 148 to the voltage source $V_3$. The ends of the capacitors 143 and 145 are connected to the said bases are each connected through a gating circuit to the input 105 to which the color burst signal synchronously detected in the synchronous demodulator 37 is applied.

The capacitor 143 is connected to the collector of a transistor 147 and to the emitter of transistor 149. The emitter of the transistor 147 and the collector of the transistor 149 are connected to the input 105. The bases of the transistors 147 and 149 are connected to an input 151 which a pulse coinciding in time with the color burst signal is applied.

The capacitor 145 is connected to the collector of a transistor 153 and to the emitter of transistor 155. The emitter of the transistor 153 and the collector of the transistor 155 are connected to the input 105. The bases of the transistors 153 and 155 are connected to an input 157 to which a pulse is applied which appears during the line flyback and prior to the occurrence of the color burst signal.

When a pulse appears at the input 157, the transistors 153 and 155 conduct and the capacitor 145 is charged up to the voltage which is present at that instant at the input 105. If an instant later a pulse occurs at the input 151, the transistors 147 and 149 conduct and the capacitor 143 is charged up to the detected color burst signal voltage which at that instant is present at the input 105. A voltage difference which is a measure of the amplitude and the polarity of the detected color burst signal is then produced at the capacitors 143 and 145. This amplitude and polarity are in turn a measure of the phase deviation of the subcarrier provided by the passive integrator 25 relative to the desired phase $\Phi_0$ of the subcarrier. The phase of the color burst signal applied to the input 61 of the synchronous demodulator is a measure of this desired phase and differs 90° therefrom.

When the phase difference between the color burst signal at the input 61 and the subcarrier signal at the input 35 of the synchronous demodulator is exactly 90°, the amplitude of the modulated color burst signal at the input 105 is zero. The capacitors 143 and 145 have the same voltage and the transistors 135, 137 and 139, 141 convey a substantially equal part of the currents supplied by the transistors 121 and 125 respectively. The AC component applied to the output 45 by the transistors 137 and 145 will be zero. If the said phase difference deviates from 90°, a voltage difference will arise between the capacitors 143 and 145 and the currents are unevenly distributed. If the voltage difference between the capacitors 143 and 145 is positive, the transistor 137 conveys a greater part of the current supplied by the transistor 121 than the transistor 135 and the transistor 141 conveys a smaller part of the current supplied by the transistor 125 than the transistor 139. The sum of the currents applied to the output 45 by the transistors 141 and 137 is then largely supplied by the transistor 137 so that the phases of the AC component therein is determined by the phase of the AC component supplied by the transistor 121. It will readily be evident that in case of a negative voltage difference between the capacitors 143 and 145 the AC component supplied by the transistor 141 relative to that supplied by the transistor 137 will be predominant at the output 45. The overall AC component at the output 45 will then have the phase of the alternating current flowing through the transistor 125 which is in phase opposition to that in the other transistor 121 of the phase inverter circuit. The polarity of the voltage difference between the capacitors 143 and 135 thus determines whether the phase of the alternating current and hence of the subcarrier signal at the output 45 is 0° or 180° relative to the phase of the signal at the input 101. The magnitude of the voltage difference determines the amplitude of the said AC component. The phase of the output voltage of the passive integrator 25 is corrected with the aid of this AC component until the phase difference between the color burst signal at the input 61 and the subcarrier signal provided by the passive integrator at the input 35 of the synchronous demodulator 37 is substantially 90°. The control signal at the input 39 thereof is then substantially zero, when the PAL phase switching signal generator 53 is in its correct switching state. If the PAL phase switching signal generator 53 is in its incorrect switching state, the control signal at the input 105 of the phase inverter and distributor circuit 103 will attempt to increase the phase difference between the input signals of the synchronous demodulator 37, because the AC component of the output signal at the output 45 of the phase inverter and distributor circuit 103 will then tend to a maximum value instead of to the value zero as in the case in the correct switching state. In principle, the explanation given with reference to the FIGS. 2 and 3 applies to the phase control.

In addition to exerting influence on the AC component supplied by the transistors 137 and 141 at the output 45, the control signal at the input 105 also exerts influence on the DC component applied by each of the transistors 139 and 135 at the outputs 115 and 117 of the phase inverter and distributor circuit 103, and hence on the voltage difference between the collectors of the said transistors.

If the voltage across the capacitor 143 is positive relative to the voltage across the capacitor 145, the greater part of the direct current provided by the transistor 125 flows through the transistor 139, and the smallest part provided by the transistor 121 flows through the transistor 135. The direct currents provided by the transistors 121 and 125 are substantially equal. The direct current flowing through the transistor 139 will thus be greater than that flowing through the transistor 135, and the voltage drop across the collector resistor 148 will exceed that across the collector resistor 146. In case of a different polarity of the voltage difference between the capacitors 143 and 145, the voltage difference between the collectors also acquires a different polarity.

At the outputs 115 and 117 a voltage difference is produced whose magnitude and polarity is a measure of the voltage difference between the capacitors 143 and 145 and hence for the amplitude and the polarity of the synchronously demodulated color burst signal applied to the input 105 and is hence a measure of the phase deviation between the color burst signal and the subcarrier signal at the inputs of the synchronous demodulator 37.

The direct current difference which is possibly present between the output 115 and 117 is applied to the inputs 111 and 113 of the polarity correction circuit 109. The input 111 is connected to the base of transistor 159 and to the emitter of a transistor 161. The input 113 is connected to the base of the transistor 161 and to the emitter of the transistor 159. The collectors of the transistors 159 and 161 are connected together and to the output 107 and through a resistor 163 to earth. The transistors 159 and 161 are of the pnp-type in this embodiment in contrast with the other transistors of FIG. 5 which are of the npn-type.

If there is no voltage difference between the inputs 111 and 113 of the polarity correction circuit 109, neither of the two transistors 159 and 161 conducts and the voltage at the output 107 is zero. If the input 111 relative to the input 113 is negative, the transistor 159 conducts when the voltage difference has exceeded a given threshold value determined by the type of transistor, and in case of inverted polarity the transistor 161. In both cases the voltage drop across the resistor 163 increases in the common collector line and hence at the output 107.

As a function of the angle $\Phi$ between the desired and the undesired phase of the chrominance subcarrier at the output 27 of the passive integrator 25, the output voltage V at the output 107 has a variation as is diagrammatically shown in FIG. 6. The coincidence circuit 75 for color killing and the PAL phase switching signal generator 53 are operated with the aid of this voltage.

The voltage at the output 107 is applied to the input 57 of the PAL phase switching signal generator 53. The input 57 is connected to the base of a transistor 163. The emitter of this transistor is connected to earth. The collector of the transistor 163 is connected through a resistor 165 to a supply source, through a resistor 167 to the input 55 and directly to an input 169 of a 2 to 1 divider 171. An output 173 of the 2 to 1 divider 171 is connected to the output 51 of the PAL phase switching signal generator 53.

If the voltage at the input 57 of the PAL phase switching signal generator 53 is zero, the transistor 163 does not conduct and the line frequency pulses received a the input 55 are passed substantially unhindered towards the input 169 of the 2 to 1 divider 171 whose output 173 provides a so-called square wave of half the line frequency. In case of a positive voltage at the input 57 as occurs at an incorrect phase of the subcarrier provided by the passive integrator 25, the voltage at the input 57 becomes positive and the transistor 163 conducts. The pulses applied to the input 55 are then greatly attenuated by the series arrangement of the resistor 167 and the conducting transistor 163 and cannot cause the 2 to 1 divider 171 to operate. The positive voltage at the input 57 occurs in case of an incorrect switching state of the PAL phase switching signal generator 53 which is automatically corrected by the above switching state so that the voltage at the input 57 becomes again zero.

The positive voltage occurring in case of an incorrect switching state of the PAL phase switching signal generator 53 at the output 107 of the polarity correction circuit 109 is also applied to the input 73 of the coincidence circuit 75. A color killing signal then appears at the output 79 thereof. In case of an incorrect switching state of the PAL phase switching signal generator 53 color display is then impossible. The color killing signal at the output 79 only disappears if the voltage at the input 73 is zero, and if the chrominance subcarrier signal detected by the amplitude detector 118 is simultaneously present at the input 77. In fact, the latter is an indication of the presence of a color burst signal at the input 23 of the passive integrator 25.

What is claimed is:

1. An identification circuit for a PAL television receiver comprising means for receiving a PAL television signal a passive subcarrier regenerator; a phase control circuit coupled to said regenerator; a synchronous demodulator having a subcarrier input coupled to said regenerator, a signal input coupled to said receiving means, and at least one output coupled to said phase control circuit; means for inverting the phase of alternate lines in response to an operation signal coupled to one of said demodulator inputs; and a PAL shift generator means for producing said operation signal coupled between said inverting means and said demodulator output.

2. A circuit as claimed in claim 1 further comprising a 90° phase shifting network having an input coupled to said regenerator and an output; a second phase inverter having an input coupled to said network output and a pair of phase opposition outputs; a current distributor having a pair of inputs coupled to said second phase inverter outputs respectively, an input coupled to said synchronous demodulator output, and a pair of outputs coupled to said generator.

3. A circuit as claimed in claim 2 further comprising a polarity correction circuit coupled between said current distributor circuit and said generator.

4. A circuit as claimed in claim 3 wherein said polarity correction circuit comprises two transistors each having emitter, base, and collector electrodes, the bases of each transistor being coupled to the emitter of the other transistor and said current distributor circuit outputs respectively, said collectors being coupled together and to said generator.

5. A circuit as claimed in claim 3 wherein said generator comprises a blocking circuit having first and second inputs coupled to receive line flyback pulse and to said polarity correction circuit respectively, and an output; and a trigger circuit coupled to said blocking circuit output and to said first recited inverting means.

6. A circuit as claimed in claim 5 wherein said blocking circuit comprises a transistor having an emitter coupled to ground, a base coupled to said polarity correction circuit, and a collector coupled to said trigger circuit; and a resistor having one terminal coupled to receive said flyback pulses and a second terminal coupled to said collector.

7. A circuit as claimed in claim 1 further comprising a coincidence circuit having a first input coupled to an output of said demodulator, a second input coupled to said regenerator output, and an output means for supplying a color killer signal.

8. A circuit as claimed in claim 3 further comprising an amplitude detector coupled to said regenerator output; and a receiving circuit television a first input coupled to said amplitude detector, a second input coupled to said correction circuit, and an output means for supplying a color killer signal.

9. A circuit as claimed in claim 1 wherein said receiving means comprises a PAL decoder including input means for receiving PAL television signal and a first output means for providing an alternating phase signal; said demodulator signal input being coupled to said decoder first output means.

10. A circuit as claimed in claim 9 wherein said PAL decoder further comprises a second output means for supplying a constant phase signal coupled to said regenerator.

* * * * *